United States Patent [19]

Bulling

[11] Patent Number: 4,776,641

[45] Date of Patent: Oct. 11, 1988

[54] APPARATUS FOR THE PROTECTION OF A HYDRAULIC BRAKE SYSTEM OF A ROAD VEHICLE AGAINST AN EVAPORATION OF THE BRAKE FLUID

[75] Inventor: Dieter Bulling, Alfdorf-Pfahlbronn, Fed. Rep. of Germany

[73] Assignee: Daimler-Benz Aktiengesellschaft, Stuttgart, Fed. Rep. of Germany

[21] Appl. No.: 127,459

[22] Filed: Dec. 2, 1987

[30] Foreign Application Priority Data

Dec. 20, 1986 [DE] Fed. Rep. of Germany ....... 3643778

[51] Int. Cl.$^4$ .................... F16D 65/20; F16D 25/062; B60T 17/22
[52] U.S. Cl. .......................................... 303/4; 60/560; 60/563; 188/72.4; 188/356; 188/264 R; 303/31
[58] Field of Search ...................... 303/4, 31; 188/72.4, 188/356, 264 R, 264 CC; 60/560, 563

[56] References Cited

U.S. PATENT DOCUMENTS

| | | | |
|---|---|---|---|
| 3,382,669 | 5/1968 | Bauer | 60/563 |
| 3,630,027 | 12/1971 | Lambert | 60/563 |
| 3,713,292 | 1/1973 | Huffman | 60/560 |
| 3,773,148 | 11/1973 | Jean-Claude et al. | 188/72.4 |

FOREIGN PATENT DOCUMENTS 3143267 6/1983 Fed. Rep. of Germany .

Primary Examiner—Duane A. Reger
Assistant Examiner—Matthew C. Graham
Attorney, Agent, or Firm—Barnes & Thornburg

[57] ABSTRACT

To protect brake fluid against evaporation under extreme braking conditions, the brake fluid contained in the wheel brake cylinders is kept at a minimum pressure between 5 and 10 bar even after completion of a braking operation, thereby increasing the boiling point of the brake fluid. The wheel brake cylinders are designed as stepped cylinders with a counterpressure space, into which a likewise constantly kept counterpressure can be introduced, which maintains equilibrium with the admission pressure prevailing in the inlet pressure space of the respective wheel brake cylinder. A non-return valve arrangement, connected between the brake booster and the inlet pressure spaces of the wheel brake cylinders, blocks the return of the brake fluid to the brake booster when the pressure differential between the wheel brake cylinders and the brake booster drops below a threshold value $P_S$. The counterpressure introduce into the counterpressure spaces of the wheel brake cylinders is likewise derived via a pressure limiting valve from a pressure accumulator element.

10 Claims, 1 Drawing Sheet

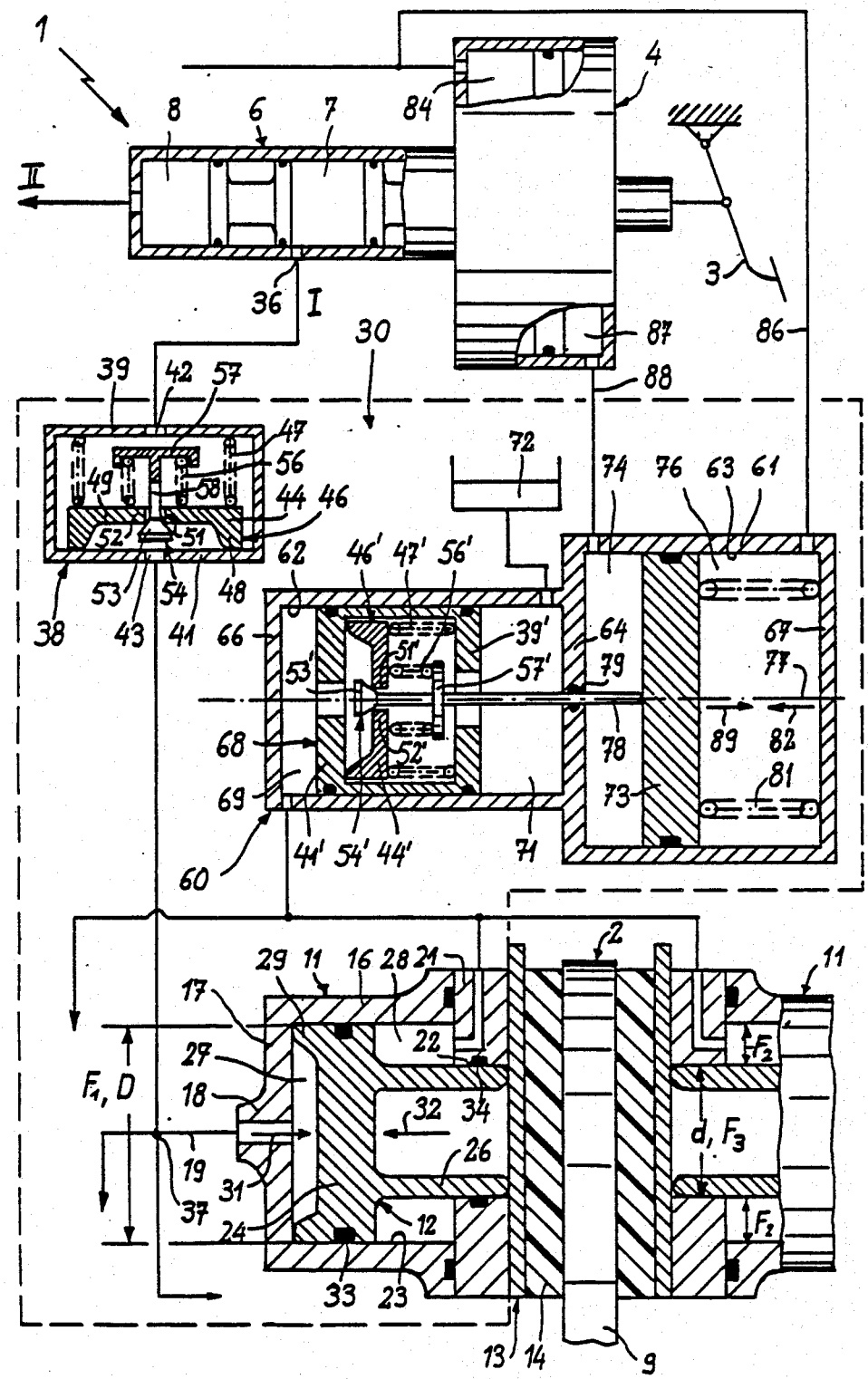

APPARATUS FOR THE PROTECTION OF A HYDRAULIC BRAKE SYSTEM OF A ROAD VEHICLE AGAINST AN EVAPORATION OF THE BRAKE FLUID

BACKGROUND AND SUMMARY OF THE INVENTION

The invention relates to an apparatus for the protection of a hydraulic brake system of a road vehicle against an evaporation of the brake fluid contained in the wheel brake cylinders of wheel brakes which can be actuated by static pressure and in the brake line sections connected to the wheel brake cylinder.

The high driving performances of modern road vehicles, in particular of passenger cars in the upper mid-size range and above, the top speeds of which may be 200 k/h and above, give rise to considerable problems in the design of suitable functionally reliable hydraulic brake systems. Since the high kinetic energy values which have to be brought down in braking generate correspondingly high amounts of heat in the brake system, risk of a vapor lock in and the consequent failure of the brake system is increased. This problem is all the more serious when the modern vehicles are aerodynamically designed with low drag coefficients ($c_w$ values), to increase driving performance. This substantially suppresses turbulence underneath the vehicle, worsens brake cooling and increases the risk of an overheating of the brakes and a consequent failure of the brake system.

To counter this risk, following a braking operation, others have passed a cooling brake fluid flow from the reservoir via the brake booster—a tandem main cylinder arrangement—located in its basic position after completion of the braking operation, to the wheel brake cylinders and from these via the brake booster back to the reservoir. The heat absorbed by the brake fluid in the wheel brake cylinders is removed by a heat exchanger. Such a system is shown in German Offenlegungsschrift No. 3,143,267.

Although this apparatus affords a perfectly effective protection against evaporation of brake fluids, it suffers from the disadvantage that the technical expenditure necessary for its realization is considerable. Namely, two jointly operable main brake cylinders are required, each having an outlet pressure space assigned to the same brake circuit of the vehicle. The brake fluid flow circulating in this brake circuit in the basic position of the two main brake cylinders being passed in series from a pump to a follow-up channel of one of these pressure spaces to the wheel brake cylinders of the respective brake circuit, to the pressure outlet of the corresponding pressure space of the other main brake cylinder, via the follow-up channel of the other main brake cylinder and a return line to the heat exchanger and into the reservoir. Irrespective of its favorable functional characteristics, this apparatus is therefore suitable at most for use in special-purpose vehicles, e.g. racing vehicles, in which the production costs do not Play a significant part from aspects of competitiveness. For use in production vehicles, even of the upper price classes, this apparatus would be much too expensive.

The object of the invention is therefore to create an apparatus of simple design and affords a reliable protection against a malfunctioning of the hydraulic service brake system of a road vehicle due to heating.

This object is achieved according to the invention by providing an admission pressure valve in line with the inlet pressure space of a wheel brake cylinder and a counter pressure cylinder connected to the counter pressure space of the wheel brake cylinder to maintain at least 4 bar or its equivalent of pressure in the brake cylinder space even after completion of braking.

According to this, the brake fluid contained in the wheel brake cylinders and the sections of the wheel brake line branches connected to the latter is kept, even after completion of a braking operation, at an admission pressure corresponding to a minimum value $P_s$, which effects an increase in the boiling point of the brake fluid by an appreciable amount. The risk of an evaporation of the brake fluid after completion of the braking operation is thereby drastically reduced. The invention is based on the realization that, by increasing the pressure of the brake fluids, usually polyglycol ether based, by for example 5 bar above atmospheric pressure (0 bar), an increase in boiling point of approximately 70° C. can be achieved. This represents a considerable increase compared with the pertinent value for the boiling point of such brake fluids at atmospheric pressure of approximately 170° C., and produces adequate protection against an evaporation of the brake fluid in all braking situations relevant in practice.

The design of the wheel brake cylinders as stepped cylinders with counterpressure spaces, likewise kept at a constant admission pressure when the brake system is not operated, has the effect of achieving the compensation of the forces acting on the wheel brake cylinder pistons, necessary for the non-activated state of the brake system. Although this consequently requires that the wheel brake cylinders are designed differently from usual, this only involves a relatively small extra expenditure and only results in insignificant extra costs in mass production.

The hydraulic components required for the maintenance and limitation of the admission pressure in the inlet pressure spaces of the wheel brake cylinders and for the introduction of the likewise limited counterpressure in the counterpressure spaces may be designed as simply constructed non-return valve arrangements or pressure transformers, which can be actuated by static pressures. These components can be used in conjunction with brake boosters of customary design and can be produced even with relatively low technical expenditure as elements to be designed for comparatively low pressures.

By keeping the admission pressure at a minimum of 4 bar and preferably between 8 and 10 bar, a high functional reliability of the brake system is provided.

The features of a counterpressure cylinder having a spring loaded piston and integral pressure limiting valve, intended for generating the counterpressure which can be introduced into the wheel brake cylinders, affords both the function of a pressure accumulator providing an adequate pressure and also the suitable limitation of the counterpressure to be introduced into the wheel brake cylinders.

The preferred design of said counterpressure cylinder and integral pressure limiting valve has the advantage that it responds very sensitively to the introduction of a braking operation and the response behavior of the brake system is virtually unaffected by the protective apparatus.

The counterpressure cylinder is a simple design of the protective apparatus according to the invention, suitable for brake systems with vacuum brake power assist unit or brake systems with hydraulic brake power assist unit.

The designs specified for the pressure limiting valve or the non-return arrangements intended for pressure limitation or for mintenance of a limited pressure in the counterpressure spaces and the inlet pressure spaces of the wheel brake cylinders make a simple and space-saving integrated configuration possible.

BRIEF DESCRIPTION OF THE DRAWINGS

The FIGURE is a block circuit diagram of a hydraulic dual-circuit brake system of a vehicle, incorporating an apparatus according to the invention for protection against evaporation of the brake fluid.

DETAILED DESCRIPTION OF THE DRAWINGS

Let it be assumed, for the purposes of explanation, that the hydraulic brake system 1, comprises a front axle brake circuit I and a rear axle brake circuit II with wheel brakes 2 which can be actuated by static pressure and are assumed to be disk brakes. A tandem main cylinder 6, of conventional design, which can be operated by brake pedal 3 via a vacuum brake power assist unit 4, likewise of conventional design, is provided as brake pressure control unit. The primary outlet pressure space 7 of cylinder 6 is connected to the front axle brake circuit I and the secondary outlet pressure space 8 of unit 4 is connected to the rear axle brake circuit II.

The wheel brakes 2, which are represented in the drawing merely by a single wheel brake, are illustrated as fixed caliper disk brakes, which have wheel brake cylinders 11 arranged symmetrically with respect to the brake disk and the pistons 12 of which each act on a brake shoe 13 with friction lining 14.

The wheel brake cylinders 11 have a substantially circular-cylindrical pot-shaped casing 16, which is closed off from the outside by the casing bottom 17. A schematically indicated connection piece 18 for the respective wheel brake line branch 19 is centrally arranged at the casing bottom 17.

On its side facing the brake shoe 13, the casing 16 is closed off by a face wall plate 21, which has a central borehole 22, the diameter d of which is clearly smaller than the diameter of the borehole 23 of the pot-shaped casing part 16. The pistons 12 of the wheel brake cylinders 11 have a circular disk-shaped flange 24, which is displaceably guided in and sealed off with respect to the borehole 23 of the housing part 16. A tappet-shaped continuation 26 of the pistons 12, which points toward and bears against or can bear against the brake shoe 13, is displaceably guided in and is sealed off with respect to the central borehole 22 of the end wall plate 21. The wheel brake cylinder piston 12 has overall the shape of a stepped piston. The disk-shaped piston flange 24 of piston 12, forms the movable limitation of the inlet pressure space 27 of the wheel brake cylinder, which is fixedly limited by the casing bottom 17. The piston flange 24 also forms the movable limitation of an annular space 28, referred to hereinafter as counterpressure space, which is fixedly limited in axial direction by the face wall plate 21. The piston flange 24 can bear with an outer annular rib 29 against the bottom 17 of the pot-shaped casing part 16.

The wheel brake cylinders 11 each have an inlet pressure space 27 which is limited by an area $F_1$ of the piston 12 corresponding to the cross-section of the casing borehole 23, and have an annular space 28 which is limited by an annular area $F_2$ of the piston 12 which is smaller than the piston area $F_1$ by the amount of the cross-sectional area $F_3$ of the piston continuation 26 or of the borehole 22 of the face wall plate 21. The design explained thus far is of the functionally essential elements of an apparatus 30 according to the invention, which prevents evaporation of brake fluid during and following a braking operation, to exclude with a high degree of certainty any failure of the brake system due to vapor lock.

This apparatus 30 operates on the principle of keeping the brake fluid contained in the drive pressure space 27 of the respective wheel brake cylinder 11, in the section of the wheel brake branch 19 connected directly to the drive pressure space 27, and in the annular space 28 under a minimum pressure, even when the brake system 1 is not operated. This pressure effects an increase in the boiling point of the brake fluid enclosed in these pressure spaces 27 and 28 sufficiently high to exclude any evaporation of the brake fluid, even during and after lengthy braking operations which lead to a correspondingly intense heating of the wheel brakes 2, including of the wheel brake cylinders 11.

To obtain an increase in boiling point of approximately 6° C. with the conventional brake fluids which are polyglycol ether based and have a boiling point at atmospheric pressure of about 170° C., it suffices to choose an admission pressure, at which the brake fluid is held in the inlet pressure space of the wheel brake cylinder, of approximately 4 bar. For an increase in boiling point of 80° C., an admission pressure of approximately 6 bar is necessary, and for an increase in boiling point of 100° C., an admission pressure of approximately 8.5 bar is necessary. The increase in boiling point decreases distinctly per bar toward greater admission pressure valves, with the consequence that increasing the admission pressure beyond 10 bar is no longer worthwhile.

The admission pressure introduced into the inlet pressure space 2 of the wheel brake cylinder 11 and the counterpressure introduced into the counterpressure space 28 are dimensioned such that the forces acting thereby on the piston 12 in the direction of the arrows 31 and 32 are compensated, at least as long as the brake system 1 is not operated. Thus the piston remains stationary after a braking operation in a basic position marked by contact of a tappet-shaped continuation 26 with the brake shoe 13. The basic position may be different depending on the degree of wear on the friction lining 14. The piston 12 should also not be displaced, for instance by a somewhat higher pressure in the counterpressure space 28, into its end position at the left according to the drawing, where the piston 12 bears with the annular rib 29 against the casing bottom 17 of the casing part 16. This could lead, in any subsequent braking, to the pedal displacement being drastically increased until brake pressure is built up and/or the displacement volumes of the tandem main cylinder outlet spaces 7 and 8 would not be sufficient to build up brake pressure in the wheel brakes 2. On the other hand, the admission pressure maintained in the inlet pressure space 27 of the wheel brake cylinder 11 should be sufficiently low in comparison with the counterpressure introduced into the counterpressure space 28 to avoid a permanent— even if only slight—application of the wheel brakes 2. Within a safety margin of approximately 1 to 2 bar, which is given by the friction of the seals 33 and 34 that seal off the piston flange 24 and the tappet-shaped continuation 26 with respect to the casing borehole 23 and the face wall borehole 22, respectively, the admission pressure introduced into the drive pressure space 27 of the wheel brake cylinder 11 should therefore be in the ratio $F_2/F_1$ with respect to the counterpressure introduced into the counterpressure space 28.

To maintain this pressure ratio—for as long as the brake system 1 is not operated—the following functional elements are provided within the scope of the apparatus 30 for each of the two brake circuits I and II. These elements are explained with reference to the front axle brake circuit I and are likewise provided in analogous design and function for the rear axle brake circuit II.

Between the pressure outlet 36 of the primary outlet pressure space 7 of the tandem main cylinder 6, assigned to the front axle brake circuit I, and the branch point 37 of the wheel brake line branches 19 of the individual wheel brake cylinders 11, there is connected a non-return valve arrangement, referred to in general as admission pressure valve 38. The admission pressure valve 38 moves into a flow position, connecting the outlet 36 of the tandem main cylinder 6 to the wheel brake cylinders 11 of the connected brake circuit I, when—in a braking operation—the outlet pressure of the tandem main cylinder 6 exceeds a threshold values $P_S$, which is equal to the minimum value of the pressure which is to be maintained constantly in the drive pressure space 27 of the wheel brake cylinder 11. The admission pressure valve 38 moves into a blocking position—on completion of the braking operation—preventing the return of brake fluid from the inlet pressure space 27 of the respective wheel brake cylinder 11 to the tandem main cylinder, as soon as the pressure differential between the inlet pressure space 27 of the wheel brake cylinder 11 and the pressure outlet 36 of the tandem main cylinder 6 has reached a minimum value, which is equivalent to the value of the pressure to be maintained in the inlet pressure space 27 of the wheel brake cylinder 11. This admission pressure valve 38 thus has the effect that— even after completion of a braking operation—a pressure equivalent to the threshold value $P_S$ is maintained in the inlet pressure space 27 of the wheel brake cylinder 11.

In the case of the design of the admission pressure valve 38 reproduced in the drawing, the admission pressure valve 38 has a circular-cylindrical casing, which is closed off by end face walls 39 and 41. The connection channel 42 on the brake booster side and the connection channel 43 on the wheel brake cylinder side, in each case represented by a borehole, are arranged centrally on end wall 39 and 41 respectively. Inside the admission pressure valve casing, a valve body 44 of a mushroom valve 46 is urged by a first, pretensioned compression spring 47 in the direction of sealing contact of its annular sealing rib 48 against the inside of the end face wall 41. The bottom 49 of the mushroom valve body 44 is provided with a central borehole 51, the rim 52 of which, facing the end face wall 51 on the wheel brake cylinder side, forms a valve seat for the valve body 53 of a conical seat valve 54. The valve body 53 is arranged between the bottom 49 of the mushroom valve body 44 and the end face wall 41 of the casing of the admission pressure valve 38 and is urged by a second pretensioned compression spring 56 into sealing contact of its conical sealing area with the valve seat 52. This second compression spring 56 is fully restrained between the bottom 49 of the mushroom valve body 44 and a support flange 57. The support flange 57 is firmly connected to the end of a rod-shaped extension piece 58 of the valve body 53 of the conical seat valve 54, passing through the central borehole 51 of the mushroom valve body 44. The pretension of this second compression spring 56 is the same as that of the compression spring 47 of the mushroom seat valve 46.

The conical seat valve 54 moves into its open position when and for as long as the outlet pressure of the tandem main cylinder 6 is greater than the threshold value $P_S$ and, in this open position, makes possible the brake pressure build-up in the inlet pressure space 27 of the respective wheel brake cylinder 11 and is kept otherwise in its—illustrated—blocking position.

For generation of the counterpressure to be introduced into the counterpressure space 28 of the wheel brake cylinder 11, a stepped cylinder, designed as a pressure transformer 60, is provided. It includes casing 61 having two borehole steps 62 and 63 of different diameter separated from each other by a partition 64 and closed off from the outside in axial direction by an end face wall 66 and 67, respectively.

A piston 68 is displaceably guided in and sealed off from the smaller borehole step. The piston 68 forms the moveable delimitation between an outlet pressure space 69, fixedly limited in axial direction by the end face wall 66 of the smaller casing step, and a compensating space 71, fixedly limited by a partition of the casing 61 of the stepped cylinder 60. The compensating space is connected to the brake fluid reservoir 72 of the brake system 1.

The piston 68 corresponds, apart from its physical dimensions, in its design to the admission pressure valve 38, including its casing, which forms the piston skirt, sealed off with respect to the casing borehole 62. The elements of the piston 68 of the stepped cylinder 60 which correspond in their basic design to the structural elements of the admission pressure valve 38 are provided with the same reference numbers as those of the admission pressure valve 38, but are provided with an apostrophe to distinguish them from the latter. With regard to the description of the structural features of such identically designated parts, reference can therefore be made, to the description of the corresponding parts of the admission pressure valve 38 and the explanation of the piston 68 can be confined to its functional characteristics.

The piston 68 is fitted in the borehole step 62 of the cylinder casing 61 with the valve seat 52' of the conical seat valve 54' arranged on the side of the valve body 44' of a mushroom valve 46' facing the end face wall 66 of the smaller casing step. Unlike the compression spring 47 of the admission pressure valve 38, the correspondingly arranged compression spring 47' of the piston 68 is pretensioned distinctly more weakly than the compression spring 56', corresponding to the compression spring 56, which urges the valve body 53' of the conical seat valve 54' into its blocking position. The pretension of this compression spring 56' is greater by the factor $F_1/F_2$ of the area ratio of the areas of the wheel brake cylinder piston 12 which can be actuated by pressure than the pretension of the correspondingly arranged compression spring 56 of the admission pressure valve 38.

In the larger borehole step 63 of the casing 61 of the stepped cylinder 60, a control piston 73 is displaceably guided and sealed off with respect to the casing borehole 63. This control piston 73 separates a control pressure space 74, fixedly limited in axial direction by the partition 64, with respect to a reference pressure space 76, which is fixedly closed off by the end face all 67. Between the support flange 57', which is firmly connected to the vave body 53' of the conical seat valve 54', and the control piston 73 there extends along the central longitudinal axis 77 of the stepped cylinder 60 a slender, elongated—rod-shaped tappet 78, which passes through and is sealed off with respect to a central borehole 79 of the partition 64. This tappet 78 is firmly connected either to the control piston 73 or to the support flange 57' of the valve body 53, to obtain a good axial guidance, and bears loosely against the other part (the support flange 57' or the control piston 73). In principle, the tappet 78 may be firmly connected both to the valve body 53' and to the control piston 73.

A pretensioned compression spring 81, which is fully restrained between the control piston 73 and the end face wall 67 of the larger casing step, has the effect of urging the control piston 73, and the piston 68, which is displaceable in the smaller borehole step 62, in the direction of the arrow 82, to the left according to the drawing. This is in the sense of a pressure build-up in the outlet pressure space 69 of the stepped cylinder 60. The pretension of this compression spring 82 is chosen to be large enough for the piston assembly 68, 73 to be pushed by the effect of this compression spring 81 alone, provided that an increased pressure is not introduced into the control pressure space 74, which is sufficient to generate in the outlet pressure space 69 of the stepped cylinder 60, the pressure necessary for the compensation of forces at the wheel brake cylinder piston 12.

In the case of the specific exemplary embodiment illustrated, in which a vacuum brake power assist unit 4 is provided as brake power assist unit, the chamber 84 is connected to the intake connection of the vehicle engine, not shown. The reference pressure space 76 is also connected to the intake connection of the vehicle engine via a vacuum line 86. The control pressure chamber 87 of the brake power assist unit 4, into which a pressure is introduced when the brake system 1 is operated, varies in proportionality with the operating force effective at the pedal 3 between the pressure prevailing at the intake connection of the engine and atmospheric pressure. This control pressure chamber 87 is connected with the control pressure space 74 of the stepped cylinder 60 via a control pressure line 88. As a result, when the brake system 1 is operated on the control piston 73, a force acting in the direction of the arrow 89 is exerted on the control piston 73 to displace it to the right against the restoring force of the compression spring 81. As a result, the piston 68 of the stepped cylinder 60 can move in the sense of an enlargement of the volume of its outlet pressure space 69, and a pressure reduction takes place in the counterpressure space 28 of the wheel brake cylinder 11. Thus, the displacement of the wheel brake cylinder piston 12 in the sense of a brake force build-up in the wheel brake 2 is possible.

For a more detailed explanation of the function of the apparatus 30 according to the invention, by which an evaporation of brake fluid in the wheel brake cylinders 11 under extreme loading of the wheel brakes 2 is to be avoided, a functional cycle of this apparatus 30 will now be explained. We shall assume that the brake system 1 is not operated and the admission pressure valve 38 assumes its illustrated basic closed positioned. Let it further be assumed that, after a lengthy period during which the vehicle is at a standstill, the pressures in the inlet pressure space 27 and in the counterpressure space 28 balance out and equal atmospheric pressure. Consequently, the pistons 68 and 73 of the stePped cylinder 60 are in their left end position.

The vehicle is started up with this initial position of the functional components of the brake system 1 and of the apparatus 30, and the brake system 1 is operated. A pressure is generated in the outlet pressure spaces 7 and 8 of the tandem main cylinder 6 which is greater than the threshold value $P_S$, which is to remain confined in the inlet pressure spaces 27 of the wheel brake cylinders 11 after completion of the braking operation. As soon as the outlet pressure of the tandem main cylinder exceeds this threshold value when the brake system 1 is operated, the conical seat valve 54 of the admission pressure valve 38 opens. As a result, the outlet pressure of the tandem main cylinder 6 is introduced into the inlet pressure spaces 27 of the wheel brake cylinders 11 of the connected wheel brakes 2.

The brake fluid volume displaced from the counterpressure space 28 passes into the outlet pressure space 69 of the stepped cylinder 60. Consequently, the pistons 68 and 73 of the stepped cylinder 60 experience a displacement in the direction of the arrow 89. At the same time, the pressure increasing with increasing pedal force which activates the control chamber 87 of the vacuum brake power assist unit is introduced into the control pressure space 74 of the larger casing step. This also has the effect of a force acting on the control piston in the direction of the arrow 89, which assists the displacement movement of this control piston 73 together with the piston 68.

In the initial phase of this displacement movement, the piston assembly 68, 73 is moved somewhat faster in the direction of the arrow 89 than would be the case if the piston assembly 68, 73 were displaced alone by the displacement of brake fluid from the counterpressure space 28 of the respective wheel brake cylinder 11 into the outlet pressure space 69, since the restoring force of the compression spring 81 is initially only little different to its minimum value. A partial vacuum is consequently produced in the outlet pressure space 69, opening the mushroom valve 46' against the—weak—restoring force of the spring 47'. As a result, the brake fluid flows out of the brake fluid reservoir 72 via the compensating space 71 and the opened mushroom valve 46' into the outlet pressure space 69 of the stepped cylinder 60.

The pressure balance occurring as a consequence between the compensating space 71 and the inlet pressure space 69 closes the mushroom valve 46' again. Such opening and closing cycles of the mushroom valve 46' may be repeated many times until the piston assembly 68, 73 has reached its end position. This end position is associated with the brake pressure introduced into the inlet pressure space 27 of the respective wheel brake cylinder 11 and with an increase in the pretension of the compression spring 81, proportional to this brake pressure, which displaced the piston assembly 68, 73.

While the brake system 1 is operated after this introductory braking phase, the pressure in the counterpressure space 28 of the respective wheel brake cylinder 11 and in the outlet pressure space 69 of the stepped cylinder 68 may have a valve which lies between 0 bar and the value $P_S \cdot F_1/F_2$, the opening pressure of the conical seat valve 54' of the piston 68.

Let it be assumed for completion of the braking phase that the driver decreases the operating force slowly. The pressure in the inlet pressure space 27 of the respective wheel brake cylinder 11 will be reduced correspondingly slowly.

The pressure reduction via the admission pressure valve 38 takes place by the mushroom valve 46 opening when and for as long as the pressure in the tandem main cylinder 6 is lower than the pressure in the inlet pressure space 27 of the respective wheel brake cylinder 11 by more than the threshold value $P_S$. As soon as the pressure differential between the wheel brake cylinder 11 and the tandem main cylinder 6 drops below this threshold value, the mushroom valve 46 of the admission pressure valve 38 closes and a pressure with the minimum amount $P_S$ remains confined in the wheel brake cylinder inlet pressure space.

To the extent to which the driver decreases the pedal force, and the control pressure space 74 is thereby progressively pressure-relieved, the piston assembly 68, 73 is pushed back by the effect of the compression spring 81 in the direction of the arrow 82 to its initial position. A higher pressure then is able to build up in the outlet pressure space 69 of the stepped cylinder 60 since this pressure space 69 had taken in an additional brake fluid volume previously during the stroke of the piston assembly 68, 73 taking place in the direction of the arrow 89 and associated with the braking oeeration. The pressure in the outlet pressure space 69 of the stepped cylinder 60 is limited to the value $P_S \cdot F_1/F_2$ by an opening and closing of the conical seat valve 54' at the pertinent threshold value $P_S \cdot F_1/F_2$ for the pressure in the counterpressure space 28 of the wheel brake cylinders 11.

At the latest after completion of the first braking operation once the vehicle has been started up, there thus remains in the inlet pressure spaces 27 and the counterpressure spaces 28 of the wheel brake cylinders 11 a pressure corresponding to the threshold values $P_S$ or the—higher—threshold value $P_S \cdot F_1/F_2$, which has, in a typical design of the apparatus 30, a value of $8\sqrt{F_1/F_2}$ bar, typical values of the area ratio $F_1/F_2$ being 2.

These admission pressures in the inlet pressure spaces 27 and the control pressure spaces 28 of the wheel brake cylinders 11 has the effect of obtaining a considerable increase in the boiling point of the confined brake fluid, which is approximately 100° C. at admission pressure of 8 bar and approximately 120° C. at admission pressures of 16 bar.

This increase in boiling point has the effect that, in virtually all conceivable cases in which otherwise—without the apparatus 30—evaporation of brake fluid and consequently a failure of the brake system would be feared, this situation of considerable potential danger is excluded.

Although explained above with reference to a brake system with vacuum brake power assist unit 4, the system 30 according to the invention can of course also be used appropriately modified in a brake system with hydraulic brake power assist units. In such a case, the pedal force-proportional outlet pressure of the brake valve of the—hydraulic—brake power assist unit is introduced into the control pressure space 34 of the stepped cylinder 60, while the reference pressure space 76 is connected to the brake fluid reservoir. The function of such a modified apparatus according to the invention is completely analogous to that of the apparatus 30 explained.

Although the present invention has been described and illustrated in detail, it is to be clearly understood that the same is by way of illustration and example only and is not to be taken by way of limitation. The spirit and scope of the invention are to be limited only by the terms of the appended claims.

I claim:

1. Apparatus for the protection of a hydraulic brake system of a road vehicle against evaporation of the brake fluid contained in wheel brake cylinders of wheel brakes which can be actuated by static pressure and brake line sections connected to the brake cylinders comprising:

stepped wheel brake cylinders with a stepped piston, the smaller step of the piston acts on the respective brake shoe and brake lining and the larger step defines, with its complete annular area $F_1$ the inlet pressure space of the respective wheel brake cylinder and, with an annular area $F_2$ reduced by the area $F_3$ of the smaller piston step, a counterpressure space;

a non-return admission pressure valve means connected between an inlet pressure spaces of the wheel brake cylinders belonging to a brake circuit and a brake booster, said admission pressure valve means is actuated in closing direction by higher pressure in the wheel brake cylinders than at the outlet of a brake booster and is actuated in opening direction when the pressure at the outlet of the brake booster is greater by a minimum threshold value $P_S$ that the pressure in the inlet pressure spaces of the connected wheel brake cylinders, the threshold value $P_S$ being at least 4 bar; and outlet pressure space of a counterpressure cylinder, the outlet pressure of which is designed to be value $P_S \cdot F_1/F_2$, is connected into the counterpressure spaces of the wheel brake cylinders.

2. Apparatus according to claim 1, wherein the threshold value of the admission pressure valve means that defines the admission pressure under which the brake fluid is kept in the inlet pressure space of the respective wheel brake cylinder is between 8 and 10 bar.

3. Apparatus according to claim 1, wherein the counterpressure cylinder has a spring-loaded piston, which determines the movable limitation of the outlet pressure space, with respect to a compensating space;

a compression spring biasing said spring loaded piston in the sense of an increase in the pressure in the outlet pressure space; and a pressure limiting valve being integrated in the spring loaded piston.

4. Apparatus according to claim 3, wherein the pressure limiting valve includes a valve body having a tappet, which extends along the central axis of the casing of the counterpressure cylinder casing, and having a radial support flange, and a closing spring which determines the closing pressure of the pressure limiting valve and acts on the spring loaded piston bearing against said support flange;

said tappet passes pressure-tightly and displaceably through a partition forming the fixed limitation of the compensating space and pressure space a drive piston, which movably limits said tappet, furthermore limits a reference pressure space, which is limited in axial direction by an end face wall of the counterpressure cylinder casing; fully restrained restoring spring is in said reference pressure space between the drive piston and the end face wall;

the valve body bearing axially via its tappet against the drive piston; and brake pedal means for providing a control pressure into the control pressure space when the brake system is operated, and the reference pressure space being connected via a compensating line to a reference pressure source, the outlet pressure of which is lower than the control pressure which can be introduced into the control pressure space.

5. Apparatus according to claim 4, for a brake system with a vacuum brake power assist unit, the vacuum chamber of which is connected to the intake connection of the vehicle engine, wherein the reference pressure space of the counterpressure cylinder is connected to the vacuum chamber of a brake power assist unit and the control pressure space of the counterpressure cylinder is connected to a control pressure chamber of the brake power assist unit.

6. Apparatus according to claim 4 for a brake system with a hydraulic brake power assist unit with a brake valve, which delivers an outlet pressure proportional to the force with which the brake system is operated, wherein the control pressure space is connected to the outlet of the brake valve and the reference pressure space is connected to the brake fluid reservoir of the brake system.

7. Apparatus according to claim 4, wherein the pressure limiting valve includes a valve seat on a mushroom valve body surrounding a central through-opening of the spring loaded piston with an annular seat, said closing spring, determining the closing pressure of the central valve, bears against said mushroom valve body, and a second spring more weakly pretension than said closing spring, between said mushroom valve body and a side of the piston remote from the outlet pressure space.

8. Apparatus according to claim 1, wherein said admission pressure valve means for limiting the admission pressure into the inlet pressure spaces of the wheel brake cylinders to the value $P_S$ comprises a central conical seat valve; the valve seat of said central valve is on a mushroom valve body having a central through-opening; a closing spring determining the closing force of the central valve bears against said valve body; the mushroom valve body including an annular sealing rib, and by a compression spring, the pretension of which corresponds to that of the compression spring of the valve, urging said sealing rib into sealing contact with the mushroom valve annularly surrounding the connection channel on the wheel brake cylinder side of the admission pressure valve means.

9. Apparatus for the protection of a hydraulic brake system against evaporation of the brake fluid contained in wheel brake cylinders and brake line sections connected to the brake cylinders comprising:

a brake cylinder having a piston dividing the cylinder into an inlet pressure space and a counterpressure space;

an admission pressure valve means connected in line with said inlet pressure space for maintaining a minimum of pressure $P_S$ of at least 4 bar in said inlet pressure space even after completion of braking; and a counterpressure cylinder means connected to said counterpressure space of said brake cylinder for maintaining a pressure in said counterpressure space to balance the force produced by said minimum pressures in said inlet pressure space.

10. Apparatus according to claim 9, wherein said piston of said brake cylinder is a stepped piston the smaller step of the piston acts on the respective brake shoe and brake lining and the larger step defines, with its complete annular area $F_1$ the inlet pressure space of the respective wheel brake cylinder and, with an annular area $F_2$ reduced by the area $F_3$ of the smaller piston step, a counterpressure space; and said counterpressure cylinder means maintains a pressure in said counterpressure space of the value $P_S \cdot F_1 / F_2$.

* * * * *